Sept. 4, 1956
J. U. LEHN
TRAP
2,761,240
Filed Jan. 3, 1951
3 Sheets-Sheet 1
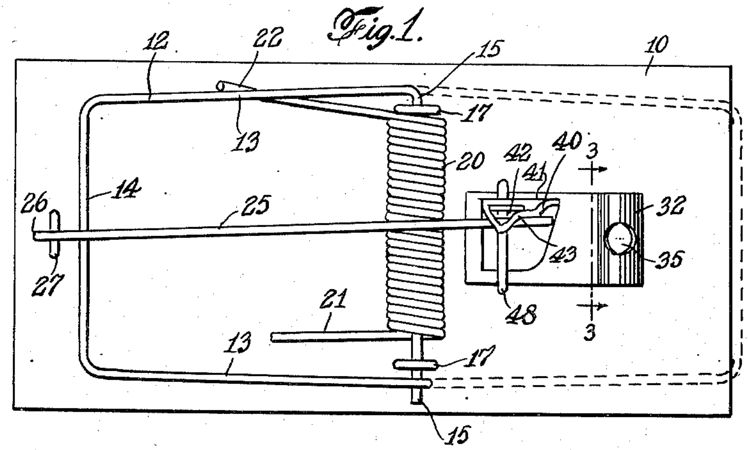
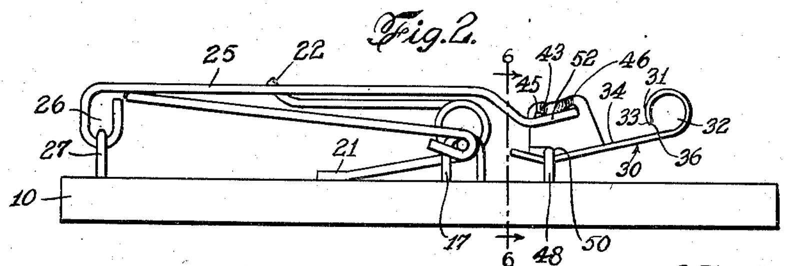
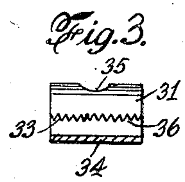
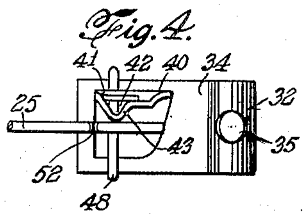
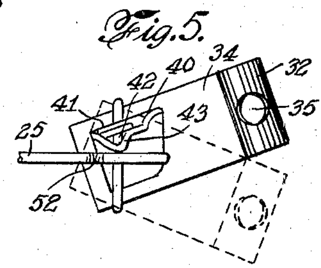
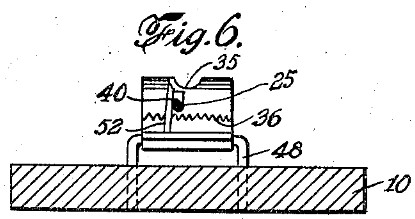
INVENTOR.
JOHN U. LEHN
BY
Robert E Burns
ATTORNEY.

Sept. 4, 1956 J. U. LEHN 2,761,240

TRAP

Filed Jan. 3, 1951 3 Sheets-Sheet 2

INVENTOR.
JOHN N. LEHN

BY

Robert E. Burns
ATTORNEY.

Sept. 4, 1956

J. U. LEHN

TRAP 2,761,240

Filed Jan. 3, 1951

INVENTOR.
JOHN U. LEHN
BY
Robert E Burns
ATTORNEY.

United States Patent Office — 2,761,240 — Patented Sept. 4, 1956

1

2,761,240

TRAP

John U. Lehn, Lititz, Pa., assignor to Animal Trap Company of America, Lititz, Pa., a corporation of Pennsylvania Application January 3, 1951, Serial No. 204,197

1 Claim. (Cl. 43—81)

This invention relates to an animal trap and is more particularly concerned with bait retaining means for a trap primarily designed for catching mice, rats and other rodents and small animals.

It is well recognized that an essential feature of a successful trap and particularly one designed to catch mice and other small animals is the adequate and secure retention of the bait in order that the animal to be caught by the trap will not eat or remove the bait without springing the trap. A trap which may be very effective in catching the animal once it has been sprung is of doubtful general utility if it is so constructed that the bait may be easily removed without springing the trap. Furthermore, a trap, particularly one designed for use in the home to catch mice, should be suitable for baiting with any of the various types of bait which may be handy. It should, for example, be suitable for use with a soft bait such as cheese, butter, and the like and at the same time be suitable for use with thin, non-moldable bait such as bacon. A trap which may be baited with one or the other of these two basically different types of baits, but not both, is inconvenient and of limited utility. It is also advantageous that the trap be constructed in such manner that it may be sprung by movement of the bait pedal in any of several directions so that the opportunity for the animal to eat the bait without springing the trap is minimized.

There have been various proposals for meeting the problem of bait theft. Some of these proposals have involved the designing of very sensitive traps which are released by the slightest touch of the bait retaining member, so that the chances of theft of the bait without springing the trap are greatly reduced. Other proposals for preventing bait theft have attacked the problem from the standpoint of providing means for more securely holding the bait, as, for example, by employing spring jaws or the like. In the manufacture of traps for home and industrial use for catching mice and other small animals, it is essential that the construction be as free as possible from complicated and intricate elements and that it be capable of being manufactured inexpensively, since this type of trap must be salable at retail for an exceedingly small price. While a trap should, of course, be reasonably sensitive, it is not necessary for general use that it have the high sensitivity which it has been heretofore found necessary to provide in order to prevent theft of the bait from the ordinary bait retaining means. Furthermore, such highly sensitive constructions greatly increase the manufacturing cost of the trap. The prior proposals which have been concerned with means for more securely retaining the bait without requiring excessive sensitivity have in some cases been reasonably effective but have generally involved constructions which are completely inconsistent with low manufacturing costs.

It is an object of the invention to provide a trap having bait retaining means of general utility.

It is a further object of the invention to provide a trap of the character indicated wherein the bait retaining means is of inexpensive construction.

2

It is another object of the invention to provide a trap having a bait retaining means arranged for securely holding all types of bait.

It is another object of the invention to provide a trap having bait retaining means of the character indicated which is effective to release the trap with a downward, an upward, or a lateral movement.

In accordance with the invention I provide a trap having a bait pedal which may conveniently be formed from a single strip of sheet metal, and which is formed with a recurvate end portion having a serrated edge which terminates close to but short of the body of the pedal. The pedal is provided with trigger means for actuating the jaw or striker of the trap. It is a feature of the invention that the bait pedal is so constructed that it will hold either soft bait, such as cheese, or thin bait, such as bacon, with equal effectiveness and will permit access to the bait from the top or from either side but will prevent complete consumption or removal of the bait without springing the trap.

Other objects and features of the invention will be apparent from the following detailed description and from the drawings, in which Fig. 1 is a plan view of a trap provided with a bait pedal embodying features of the present invention;

Fig. 2 is a side elevation of the trap shown in Fig. 1, illustrating more clearly the formation of the bait holding end portion of the bait pedal;

Fig. 3 is a sectional view taken approximately along line 3—3 of Fig. 1;

Figs. 4 and 5 are detail plan views of the bait pedal and locking bar of the trap, Fig. 5 showing the pedal in laterally moved positions;

Fig. 6 is a sectional view taken approximately along the line 6—6 of Fig. 2;

Figure 9:
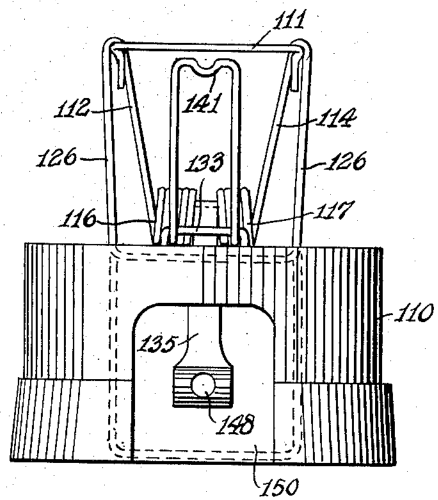
Fig. 9 is a front elevation of a choker type trap embodying features of the invention; and Fig. *9a* is a side elevation partly in section of the trap shown in Fig. 9.

Referring to the drawings, and particularly to Fig. 1, the numeral 10 designates the base upon which the operative parts of the trap are mounted and which is suitably constructed of wood but may be formed from other material. A pivoted jaw or striker 12 in the form of a bale has side arms 13, a cross bar 14 and a pivot portion 15 which is pivotally held as by staples 17 secured to base 10. Positioned around pivot portion 15 is a coil spring 20 having an end 21 which presses against base 10 and an end 22 which engages one of the arms 13 of jaw 12. A locking bar 25 is pivotally mounted at one end of base 10, one end of locking bar 25 being formed with an eye 26 through which passes a staple 27, or like securing means. The other end of the locking bar 25 is free and adapted to engage the trigger portion of the bait pedal, as will be described more fully hereinafter.

The bait pedal, designated by the numeral 30, is formed from a single strip of sheet metal which has been cut and stamped to provide a trigger portion for engaging the locking bar 25 and an end bait-retaining portion adapted for securely holding all types of commonly used bait. Thus, the outer end 31 of bait pedal 30 is reversely rolled to form a substantially cylindrical chamber 32 having a serrated, depending edge portion 33 which is curved slightly inwardly. An aperture 35, which in the embodiment shown is circular, is formed in the upper portion of chamber 32 to permit access to the bait from the top of the pedal. It will be observed that the ends of chamber 32 are open, thus permitting the chamber to be readily filled with cheese or other soft bait and to permit access to the bait from either side of the pedal. The depending serrated edge portion 33 as shown in Fig. 3 and Fig. 6 approaches the body portion 34 of pedal 30 but terminates sufficiently short of it to define a relatively narrow space in which may be wedged thin, non-moldable bait such as bacon. The teeth 36 of edge 33 engage the bait and by reason of their downward and slightly rearward inclination resist removal of the bait. The distance between the lower edges of teeth 36 and the top surface of the body portion 34 is preferably of the order of $\frac{1}{32}''$ to $\frac{1}{16}''$. If the teeth are too close to body portion 34 they will not permit insertion of thin bait whereas if the spacing between the teeth and the body portion is too great retention of the bait will be difficult. It is of course possible to fold the bait and accordingly spacings up to about $\frac{1}{8}''$ may be provided.

In the embodiment shown in Fig. 1 the rearward end of bait pedal 30, i. e. the end nearer spring 20 and opposite chamber 32, is provided with an upwardly extending portion 40 which is cut from the interior of the metal strip and is bent upward in vertical position along the line 41 to form the trigger support. Vertical portion 40 is provided with a slot 42 substantially parallel to the bending line 41 defining a relatively thin strip 43 connected integrally at its ends with the main body of portion 40. The strip 43 is bent laterally as clearly shown in Figs. 1 and 5 to form the trigger of the trap. The strip 43 forming the trigger is bent inwardly toward the center of pedal 30 and forms opposite cam portions 45 and 46. The pedal 30 is mounted upon base 10 by means of a staple 48 which passes through an aperture 50 formed near the base of upstanding portion 40. The staple is slightly wider than the width of the strip forming the pedal 30 so that the pedal may pivot laterally or vertically. The free end of the locking bar 25 is bent slightly to form upwardly sloped surface 52 for engaging the trigger 43 as shown in Fig. 2.

In order to set the trap, the jaw is swung from the released position indicated in dotted lines in Fig. 1 to the set position indicated in full lines in Figs. 1 and 2 and the locking bar 25 is placed across end portion 14 of jaw 12 and the sloped surface 52 is placed under trigger 43. When the slot 42 is substantially parallel with sloped surface 52, frictional engagement between surface 52 and trigger 43 and the upward thrust on locking bar 25 transmitted through jaw 12 from spring 20 holds the trap in set position. When, however, the bait pedal 30 is moved upwardly, downwardly or laterally the engagement between cam surfaces 45 and 46 and the upwardly inclined surface 52 of locking bar 25 frees locking bar 25 from engagement with trigger 43 and thereby releases jaw 12 which, under the influence of spring 20, snaps to its sprung position. The effect of lateral movement of pedal 30 in the release of locking bar 25 is clearly shown in Fig. 5.

While in the foregoing description I have referred to a bait pedal constructed according to the invention and having a preferred trigger mechanism which may be released by downward, upward or lateral movement, I do not wish to be limited thereto and it will be apparent that I may form a bait pedal having bait retaining means constructed in accordance with the invention but being arranged for use with a different type of trap.

Figure 7:
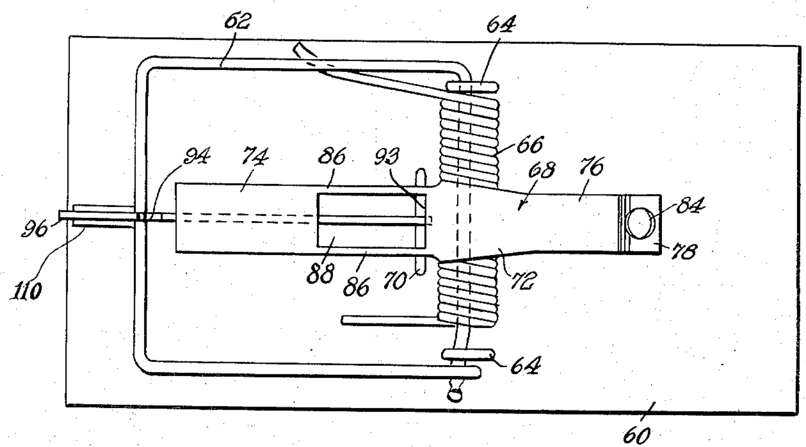
Fig. 7 is a plan view of another type of trap embodying the bait pedal of the invention.
Figure 8:
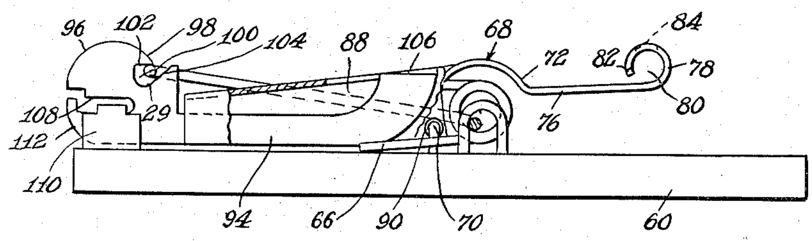
Fig. 8 is a side elevation partly in section of the trap shown in Fig. 7.

Referring to Figs. 7 and 8 I show a trap of the automatically settable type embodying features of my invention. This trap includes a generally rectangular base 60 and a striker or jaw 62 pivotally attached to the base by staples 64. A coiled spring 66, similar to spring 20 of Fig. 1, is adapted to urge the jaw in tripping position. A pivotally mounted bait holding pedal 68 is supported approximately in the center of the base 60 by a staple 70. The bait pedal is formed with a bait holding portion 72 and a weighted portion 74. The bait holding portion 72 is arched upwardly to provide clearance for the spring 66 and is formed with an outwardly extending body 76 terminating in a recurvate end portion 78 defining an approximately cylindrical chamber 80 and having a serrated edge 82 approaching but providing a clearance of $\frac{1}{32}''$ to $\frac{1}{8}''$ with respect to the body 76. Chamber 80 is provided with a top aperture 84 and has open ends. The weighted portion 74 of the pedal has a channel-shaped cross-section with side walls 86 and has its open side facing downwardly. The upper side of the weighted portion is slotted as indicated at 88. The side wall 86 of the channeled portion have apertures as indicated at 90 for the pivotal mounting of the pedal on the staple 70. The slot 88 extends forwardly towards the bait holding portion of the pedal just past a vertical plane through the apertures 90, and ends in a detent edge 93. The weighted portion 74 is formed with sufficient material so that normally the bait-holding portion 68 is raised away from the base 60 while the weighted portion 74 rests thereon.

The latching or locking member 94 which holds the jaw 62 when the trap is set and is held in engaged position by the bait pedal 68, is a thin flat strip formed with a higher rear end portion 96 having a downwardly and forwardly extending cam surface 98 at the lower end of which is a locking recess 100 for receiving the cross bar of the jaw 62. The upper wall 102 of the recess 100 is shown as straight and parallel with the surface of the base 60 although the angle of the wall may be inclined to a slight degree either above or below a line parallel with the base depending upon the sensitivity desired in the trap. The forward wall of the recess 100 is formed with a downwardly and rearwardly extending cam surface 104. The front end of the latching member 94 is curved upwardly and has a flat tip upper surface 106 the height of which is such that the latching member will just slide under the detent edge 93 of the pedal at the forward end of the slot 88. Mounting and guiding means for the latching member 94 are provided to permit it to slide forwardly and rearwardly and comprise a generally horizontal slot 108 formed in the end 96 and a staple 110. The staple 110 has wide sidewalls to provide guiding surfaces and is inserted in the slot 108 and secured in the base 60. The lower surface of the end 96 is curved, as indicated at 112, to permit a slight pivotal movement of the latching member 94 on its support. The staple 110 is positioned in the slot 108 in such manner that the latching member is held in an upright position, freedom of movement being assured in the forward and rearward direction and sufficient play being available to permit the latching member to pivotally turn to a slight extent on its curved end 112.

In setting the trap, the jaw 62 is swung back until it contacts the cam surface 98 of the latching member 94. Pressing the jaw 62 on this surface causes a cam action which slides the latching member 94 rearwardly in its support 110. However, in the event the latch has already slipped rearwardly as far as possible, the jaw 62 will not strike the cam surface 98 but will contact the cam surface 104 thus immediately moving the latch member 94 into latching position. When the latching member moves rearwardly far enough for the jaw to clear the forward end of the cam surface 98, the jaw slips into the locking recess 100 and further pressure causes the jaw 62 to contact the cam surface 100 which causes a cam action in the opposite direction, or forwardly, thereby moving the latching member 94 forward until the upper wall 102 of the locking recess 100 is over the jaw and the forward end of the latching member extends under the detent edge 93 at the end of the slot 88. Upon the release of pressure on the jaw, it will move upwardly against the upper wall 102 of the locking recess 100 and tend to turn the latching member in counterclockwise direction, whereupon the tip 106 will contact the underside of the detent or trigger portion 93 of the bait pedal at the forward end of the slot 88, thereby restraining further turning of the latching member and securing the jaw 62 in the locking recess 100. The trap is tripped by the downward movement of the bait holding end of the pedal, thereby pivotally moving the pedal in clockwise direction about its support 70 and rotating the forward end of slot 88 away from the tip 106 of the latching member 94. The latching member is thereby released and is rotated slightly in counterclockwise direction by action of jaw 62 on the upper wall 102 of the locking recess 100. This movement of the latching member 94 causes the surface 102 to have a slight upward pitch at its forward end to permit the jaw 62 to clear the forward end of the cam surface 98 and slip out of the locking recess.

Although in the trap just described release of the latching member 94 to effect springing of the trap is effected primarily upon downward movement of the bait-holding end of bait pedal 68, the construction of the recurvate bait-holding means is such that the animal will not consume or steal the bait without springing the trap. As previously mentioned, in the trap of Fig. 1, release of the locking bar 25 which, like the latching member 94, holds the jaw in set position, is effected by upward, downward or lateral pivotal movement of the bait pedal.

My improved bait pedal is of utility not only in traps of the striker type such as those above described, but is also effectively employed in other types of traps such as the so-called "choker" type wherein a U-shaped bail or choker is drawn upon release of the trap around the throat of the animal to be caught. Thus, referring to Figs. 9 and 9*a* there is shown a choker type trap comprising a hollow pedestal base 110 upon which is mounted the choker actuating mechanism comprising a wire formed to define a cross-bar 111 and arms 112 and 114 integral with coiled spring portions 116 and 117, respectively, and having the free ends 120 extending downwardly through an aperture 122 in the upper surface of the base 110. Connected with the arms 112 and 114 adjacent the cross-bar 111 is the U-shaped choker member 125, the arms 126 of which extend through apertures 130 in the base 110. A locking bar 132 is pivotally mounted by means of a staple 133 on the base 110 adjacent the apertures 130. The locking bar 132 is adapted to overlie the cross-bar 111 when the trap is set to hold the choker member 125 in its lowermost position as shown by dotted lines in Fig. 9. The locking bar 132 is held in locked position when the trap is set by engagement with the end of bait pedal 135 which is pivotally mounted on a staple 136 centrally of the top surface of the base 110 and extends downwardly into the hollow portion of the base through an aperture 138. The upper end of the bait pedal 135 is formed with a hooked portion 140 which is adapted to engage the cross-member 141 on the locking bar. The bait pedal 135 is formed from an integral strip which is cut and bent in any convenient manner to receive the staple 136 as shown in Fig. 9*a*. The lower end of the bait pedal 135 terminates in a recurvate end portion 142 defining an approximately cylindrical chamber 144 and having a serrated edge 146 approaching, but providing a clearance of 1/32" to 1/8" with respect to the body portion of the pedal 135. Chamber 144 is provided with an aperture 148 and has open ends. Thus, the bait holding portion of the bait pedal 135 is substantially identical with the corresponding portions of the bait pedal 30 of the embodiment of Figs. 1 to 6 and the bait pedal 68 of the embodiment of Figs. 7 and 8.

Figure 9A:
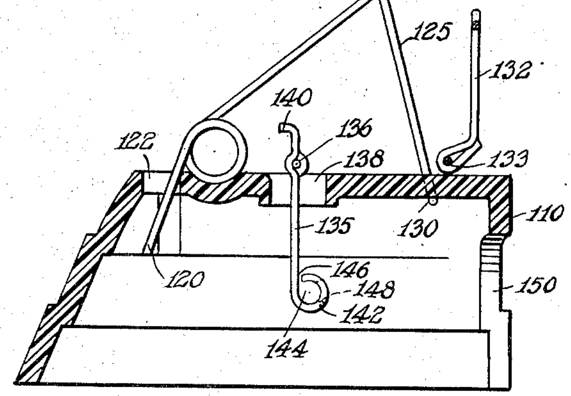

To set the trap shown in Figs. 9 and 9*a*, the choker member 135 is pushed downwardly into the position shown in dotted lines in Fig. 9. The locking bar 132 is pivoted over cross-bar 111 and its cross-member 141 is engaged with the hooked portion 140 of the bait pedal 135. When in set position the choker member 125 is disposed in alignment with the aperture 150 through which the animal enters in seeking the bait held by the bait pedal 135. When the recurvate end of the bait pedal 135 is pivoted rearwardly by the nose of the animal, the hooked portion 140 moves forwardly and releases the locking bar 132 thereby simultaneously releasing the choker member 125 which moves upwardly under the influence of the springs 116 and 117 and catches the animal.

While I have illustrated and described illustrative embodiments of my invention, it will be obvious that various changes and modifications may be made without departing from the scope thereof, as defined in the appended claim, and it is intended, therefore, that all matter contained in the foregoing description and in the drawings shall be interpreted as illustrative and not in a limiting sense.

What I claim and desire to secure by Letters Patent is:

In an animal trap of the type comprising a base, a spring-actuated animal engaging means and latching means for said engaging means, and a bait pedal pivotally connected to said base, said bait pedal consisting entirely of a single integral strip having a trigger portion adapted to be engaged by the latching means for holding the animal engaging means in set position and having a recurvate bait receiving end portion formed with a serrated, continuous substantially rectilinear end edge extending from one side of said strip to the other and terminating close to but spaced from the body portion of said strip to define a clearance between said serrated edge and the body portion of the pedal for gripping reception of thin bait strips, said recurvate end portion defining a substantially cylindrical open-ended chamber having an upper wall portion with an aperture spaced between the ends thereof and spaced from said end edge but occupying a minor proportion of the surface area of said cylindrical chamber, said serrated end edge having teeth directed obliquely with respect to said strip and in the direction of the interior of said open ended chamber and the clearance between the teeth of the serrated edge and the body portion of the pedal being approximately 1/32" to 1/8".

References Cited in the file of this patent

UNITED STATES PATENTS

| | | |
|---|---|---|
| 1,456,981 | Goss | May 29, 1923 |
| 2,173,027 | Speer | Sept. 12, 1939 |
| 2,188,297 | Graybill | Jan. 30, 1940 |
| 2,228,695 | Dorsey | Jan. 14, 1941 |
| 2,348,981 | Johnson | May 16, 1944 |
| 2,422,602 | Vallely | June 17, 1947 |
| 2,596,289 | Rowell | May 13, 1952 |
| 2,603,906 | Koch et al. | July 22, 1952 |
| 2,610,431 | Osborn et al. | Sept. 16, 1952 |

FOREIGN PATENTS

| | | |
|---|---|---|
| 100,692 | Australia | Apr. 1, 1937 |